UNITED STATES PATENT OFFICE.

THOMAS KIDDIE, OF NEW BRIGHTON, NEW YORK, ASSIGNOR TO THE ORFORD COPPER COMPANY, OF NEW JERSEY.

PROCESS OF SEPARATING PRECIOUS METALS AND IMPURITIES FROM SOLUTIONS OF COPPER, SALTS, ORES, MATTES, &c., IN ACIDS.

SPECIFICATION forming part of Letters Patent No. 377,809, dated February 14, 1888.

Application filed January 3, 1885. Serial No. 154,585. (No specimens.)

*To all whom it may concern:*

Be it known that I, THOMAS KIDDIE, a subject of the Queen of Great Britain, residing at New Brighton, in the county of Richmond and State of New York, have invented certain new and useful Improvements in Processes of Separating Precious Metals and Impurities from Solutions of Copper, Salts, Ores, Mattes, &c., in Acids, of which the following is a specification, reference being had therein to the accompanying drawing.

My invention relates to a process of separating precious metals and all kinds of impurities—such as arsenic, antimony, bismuth, &c.—from solutions of copper in sulphuric acid derived from copper mattes, ores, bullion, &c., and the chief objects of the same are to effect in the process of leaching copper from ores, mattes, &c., rich in precious metal, first, a more perfect separation of the precious metals and impurities than has heretofore been possible by means of comparatively cheap reagents, and, second, the reduction of ferric and cupric salts contained in the liquid to ferrous or cuprous salts, or salts of the lower oxides of the metals therein contained, for the purpose of facilitating subsequent precipitation by means of metallic iron or other suitable reagents.

When copper mattes rich in precious metals are subjected to a thorough calcination, the result is that the chemical composition of the mattes so treated is very materially changed. Where, for example, the matte contained originally, say, eighty per cent. of sulphide of copper, and the balance of arsenic, iron, antimony, sulphur, and other impurities, together with silver and gold, it will be found to contain, after calcination, say sixty-five per cent. of oxide of copper, and the balance will be composed of cuprous sulphides, ferric oxide, and the precious metals and impurities in the form of oxides or arseniates and antimoniates.

When a sufficient quantity of copper matte, ores, &c., the component parts of which have been changed by calcination to the form of oxides, is dissolved in sulphuric acid, diluted or not, and with or without the addition of heat, so as to make a perfectly neutral solution, the latter will be composed of sulphates of copper and iron, as well as sulphates of all other metals which are in the calcined material in the form of oxides, and whose oxides are soluble in dilute sulphuric acid.

Now I have discovered that when hydrates of any of the alkali or iron groups of metals—such as ferrous hydrate, ferric hydrate, ferroso-ferric hydrate, cupric, calcic, sodic, or potassic hydrate, &c.—are added in excess of the chemical equivalent to a perfectly neutral solution of sulphates of the metals soluble in dilute sulphuric acid, such as those above described, a very perfect separation of the impurities is obtained, and a reduction of the salts of the higher oxides of copper to salts of the lower oxides is effected by reason of the chemical precipitation of these salts by the hydrates of metals above mentioned. After these precipitates have settled, the impurities and insoluble matter may be readily removed from the solution by filtration. This operation may be conducted in any convenient form of vessel, and the hydrates used may be prepared in any convenient manner. Thus copper and iron hydrates may be produced by mixing milk of lime with solutions of sulphate of copper or sulphate of iron with or without the addition of steam or other heating agent, whereby the lime unites chemically with the sulphuric acid in the solution, and the iron or copper forms hydrates of the various salts of the metals present therein. The hydrates, mingled with certain intermediate hydrates of the sesquioxides of the metal found therein caused by oxidation, are introduced into the vessel and the whole solution is then agitated thoroughly to facilitate the precipitation; but the agitation may, if desired, be omitted. If necessary, steam may be added for the purpose of facilitating the operation, but this is not absolutely essential. When ferroso-ferric hydrate is used, it may be made by blowing air into ferrous hydrate, prepared as above described, until the same turns black. When potassic or sodic hydrate is used, a solution of it in water is made up to a strength of 15° Baumé, and is so added to the copper liquid to be treated at the rate of about sixty gallons an hour, diluting it with about an equal volume of water while agitating, as above described.

Hydrates such as those above described have the property of reducing ferric and cupric salts contained in the neutral sulphuric-acid solution to cuprous and ferrous salts, thus reducing the amount of iron necessary to precipitate the copper from its liquors, and thereby saving considerable expense in the subsequent process of precipitation.

Any bismuth which may have been contained in the ore, matte, &c., owing to the solution being perfectly neutral, will settle with the undissolved portions of the calcined matte, ore, &c., the arsenic and antimony will combine with the iron and be precipitated, while the cuprous and cupric sulphide, ferric oxide, ferrous sulphide, and other metals, and the salts thereof in the matte or ore, will settle as a slime after the agitation of the solution ceases. In case sulphate of silver is found in the calcined matte, there will be in most cases sufficient metallic copper and copper suboxide left in the slimes undissolved by the sulphuric acid to precipitate the silver as metallic silver.

The solution, after adding the iron or other hydrates, may be agitated in any convenient form of vessel, and the entire contents of the agitator, after agitating, run into a settling-tank and allowed to settle, and may be finally filtered in any convenient manner. The filtrate will be found to be composed entirely of cupric sulphate and ferrous sulphate, and the precipitate or slime to contain all of the precious metals and impurities.

The process above may also be adapted for separating the impurities and precious metals from coarse copper bullion in the following manner: The bullion, while it is still in a molten state, is run into a constantly-flowing stream of water, where it becomes granulated. It is then placed in a calcining-furnace and desulphurized. If one operation is not sufficient, it is again melted, and this operation is repeated. When practically all the sulphur is removed, the bullion is treated with sulphuric acid in the same way as the calcined mattes above described.

I am aware that hydrates of the peroxides of the iron metals will precipitate free arsenic and antimonic acids in solution; hence I do not claim the same as an element in my process. I believe, however, that it is new to precipitate the arsenic and antimony contained in neutral solutions of arseniates or antimoniates of copper by means of hydrates of various oxides of metals of varying degrees of oxidation, which at the same time produce a reduction of the degree of oxidation of the salts of copper for the purpose of forming insoluble arseniates and antimoniates of the metals other than copper, which will be separated therefrom with the precious metals and other insoluble portions of the solution.

I claim as my invention—

1. The hereinbefore-described process of removing precious metals and impurities from copper mattes, ores, &c., consisting in dissolving the same after calcination in sulphuric acid in quantities sufficient to form a neutral solution, and in adding thereto hydrates of the alkaline or iron metals of varying degrees of oxidation, with or without heat or agitation, whereby said impurities are precipitated, and settle with the precious metals and other portions not dissolved by the sulphuric acid, and a reduction of the salts in the solution to salts of suboxides of iron and copper is effected.

2. The hereinbefore-described process of removing precious metals and impurities from copper mattes, ores, bullion, &c., consisting in dissolving the same after desulphurization and calcination in sulphuric acid in quantities sufficient to form a neutral solution, and in adding iron hydrates to the neutral sölution, whereby the impurities are precipitated and settle with the precious metals not dissolved by the sulphuric acid, leaving a comparatively pure solution of iron and copper salts.

In testimony whereof I affix my signature in presence of two witnesses.

THOMAS KIDDIE.

Witnesses:
GEO. A. LAUD,
FRED. F. HUNT.